United States Patent
Lai (10) Patent No.: US 9,878,193 B2
(45) Date of Patent: Jan. 30, 2018

(54) LINEAR DISPLACEMENT DAMPER STRUCTURE

(71) Applicant: Chia Min Lai, Taichung (TW)

(72) Inventor: Chia Min Lai, Taichung (TW)

(73) Assignee: Singularity Ltd., Belize (BZ)

( * ) Notice: Subject to any disclaimer, the term of this patent is extended or adjusted under 35 U.S.C. 154(b) by 0 days.

(21) Appl. No.: 15/357,094

(22) Filed: Nov. 21, 2016

(65) Prior Publication Data

US 2017/0165515 A1 Jun. 15, 2017

(30) Foreign Application Priority Data

Dec. 9, 2015 (TW) .............................. 104141249 A (51) Int. Cl.
| | | |
|---|---|---|
| *A63B 21/005* | (2006.01) | |
| *F16F 6/00* | (2006.01) | |
| *A63B 21/00* | (2006.01) | |
| *A63B 23/12* | (2006.01) | |

(52) U.S. Cl.
CPC .... *A63B 21/0051* (2013.01); *A63B 21/00069* (2013.01); *A63B 21/154* (2013.01); *A63B 21/4047* (2015.10); *A63B 23/12* (2013.01); *F16F 6/005* (2013.01); *F16F 2232/02* (2013.01); *F16F 2232/08* (2013.01)

(58) Field of Classification Search
CPC .......... H02K 7/025; H02K 7/06; H02K 7/116; F16F 6/005
USPC ................ 482/1, 2, 5, 6, 81; 188/29, 68, 74, 188/156–164, 267
See application file for complete search history.

(56) References Cited

U.S. PATENT DOCUMENTS

| | | | | |
|---|---|---|---|---|
| 4,152,617 A | * | 5/1979 | Janson ................... | H02K 49/00 310/103 |
| 5,465,815 A | * | 11/1995 | Ikegami .................. | F16D 63/00 188/164 |
| 5,711,404 A | * | 1/1998 | Lee ..................... | A63B 21/0051 188/158 |
| 5,848,953 A | * | 12/1998 | Wei .................... | A63B 21/0051 188/164 |
| 5,851,165 A | * | 12/1998 | Wei .................... | A63B 21/0051 188/164 |

(Continued)

FOREIGN PATENT DOCUMENTS

| | | |
|---|---|---|
| CN | 103821861 B | 5/2015 |
| TW | M452790 U | 5/2013 |

*Primary Examiner* — Christopher Schwartz
(74) *Attorney, Agent, or Firm* — Rosenberg, Klein & Lee (57) ABSTRACT

A linear displacement damper structure includes a screw shaft, a metallic disk, a screw barrel, a controlling member, and a driving member. The screw shaft is fixed in a position, connected to the metallic disk, and threaded with the screw barrel. The screw barrel is connected to an external device and driven by the external device to perform a linear displacement along a length direction of the screw shaft relative to the screw shaft, so that the screw shaft drives the screw shaft and the metallic shaft. The controlling member has a permanent magnet and is disposed near to the metallic disk, so that the metallic disk generates a magnetic resistance to reduce the rotation speed of the metallic disk. The driving member drives the controlling member to move to change a distance between the controlling member and the metallic disk to adjust the magnitude of the magnetic resistance.

4 Claims, 7 Drawing Sheets

(56) References Cited

U.S. PATENT DOCUMENTS

| | | | |
|---|---|---|---|
| 6,158,558 A * | 12/2000 | Bill | F16D 65/18 188/162 |
| 6,273,845 B1 * | 8/2001 | Liou | A63B 21/0051 188/164 |
| 6,345,703 B1 * | 2/2002 | Peng | F16F 15/035 188/164 |
| 6,585,087 B2 * | 7/2003 | Lin | A63B 21/0051 188/164 |
| 7,018,324 B1 * | 3/2006 | Lin | A63B 21/0052 188/158 |
| 7,431,133 B2 * | 10/2008 | Maron | B60T 7/045 188/158 |
| 7,732,961 B2 * | 6/2010 | Lin | H02K 1/146 310/153 |
| 8,026,647 B2 * | 9/2011 | Seo | H02K 7/025 188/161 |
| 8,932,185 B2 * | 1/2015 | Hsieh | H02K 21/025 188/164 |
| 2008/0261775 A1 * | 10/2008 | Chang | A63B 21/0051 482/5 |

* cited by examiner

LINEAR DISPLACEMENT DAMPER STRUCTURE

BACKGROUND OF THE INVENTION

Field of the Invention

The present invention relates to a damper structure, in particular to a damper structure utilizing the linear displacement of the transmission shaft for generating magnetic resistance.

Description of the Prior Art

Conventionally, dampers are utilized in training equipments for body exercise or for rehabilitations to increase the resistance for operating a mechanism of the training equipment. A common damper is a pressure cylinder, for example, a hydraulic cylinder or a pneumatic cylinder. A piston shaft of the cylinder is connected to the mechanism. The reciprocal displacement of the mechanism drives the piston shaft to move. The moving of the piston shaft is retarded by the resisting force from the fluid in the cylinder. In other words, a user has to apply much more forces for driving the mechanism of the training equipment to achieve the training purposes.

However, in the conventional design, the repeated displacements of the piston shaft increase wearing between the fluid in the cylinder and an oil sealing member of the cylinder so as to increase the temperature of the cylinder increases. As a result, the oil sealing member of the cylinder would be solidified or even broken. Eventually, the fluid may leak from the cylinder to reduce the damping performance. On the other hand, the change of the temperature of the fluid also changes the physical properties of the fluid. As a result, the damping performance capable of being provided by the cylinder is not stable. Consequently, the damping performance of the training equipment cannot be standardized.

SUMMARY OF THE INVENTION

One object of the present invention is to provide a linear displacement damper structure in which a metallic disk is rotated by the linear displacement of a screw barrel and a permanent magnet is interacted with the metallic disk to generate an eddy current to form magnetic resistance. Hence, the operation of the screw barrel and the metallic disk can be confined.

In view of these, the linear displacement damper structure comprises a screw shaft fixed in a defined position; a metallic disk connected to the screw shaft; a screw barrel threaded with the screw shaft, wherein the screw barrel is connected to an external device, and the screw barrel is driven by the external device to perform a linear displacement relative to the screw shaft along a length direction of the screw shaft, so that the screw barrel drives the screw shaft and the metallic disk to rotate; a controlling ember disposed near to the metallic disk, wherein the controlling member comprises a permanent magnet; and a driving member for driving the controlling member to move so as to change a distance between the controlling member and the metallic disk.

The screw shaft and the metallic disk are connected by a transmission mechanism, and the transmission mechanism transmits a rotation of the screw shaft to drive the metallic disk to rotate.

DETAIL PORTIONED DESCRIPTION OF THE PREFERRED EMBODIMENTS

Figure 1:
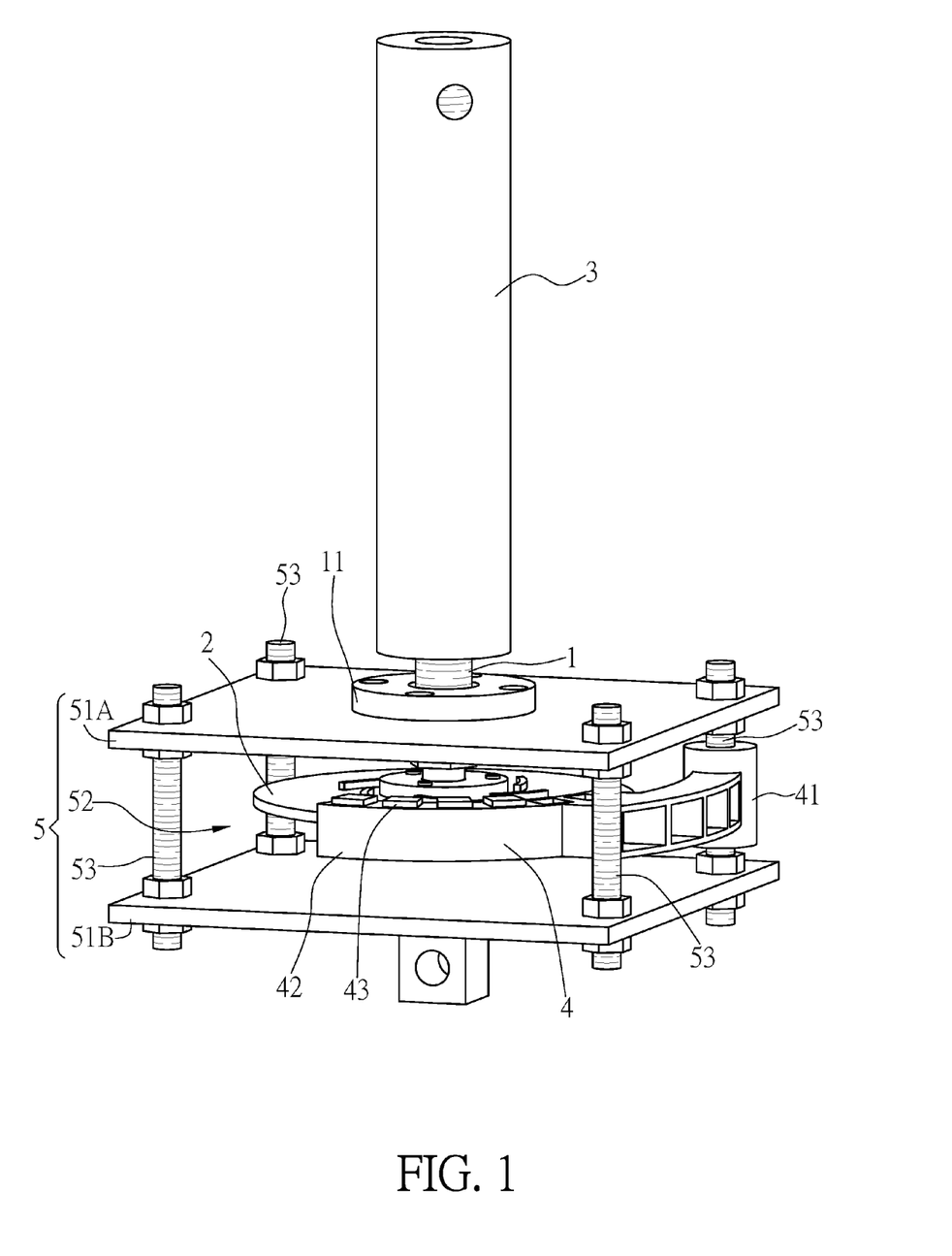
FIG. 1 illustrates a perspective view of a linear displacement damper structure according to an exemplary embodiment of the present invention.
Figure 2:
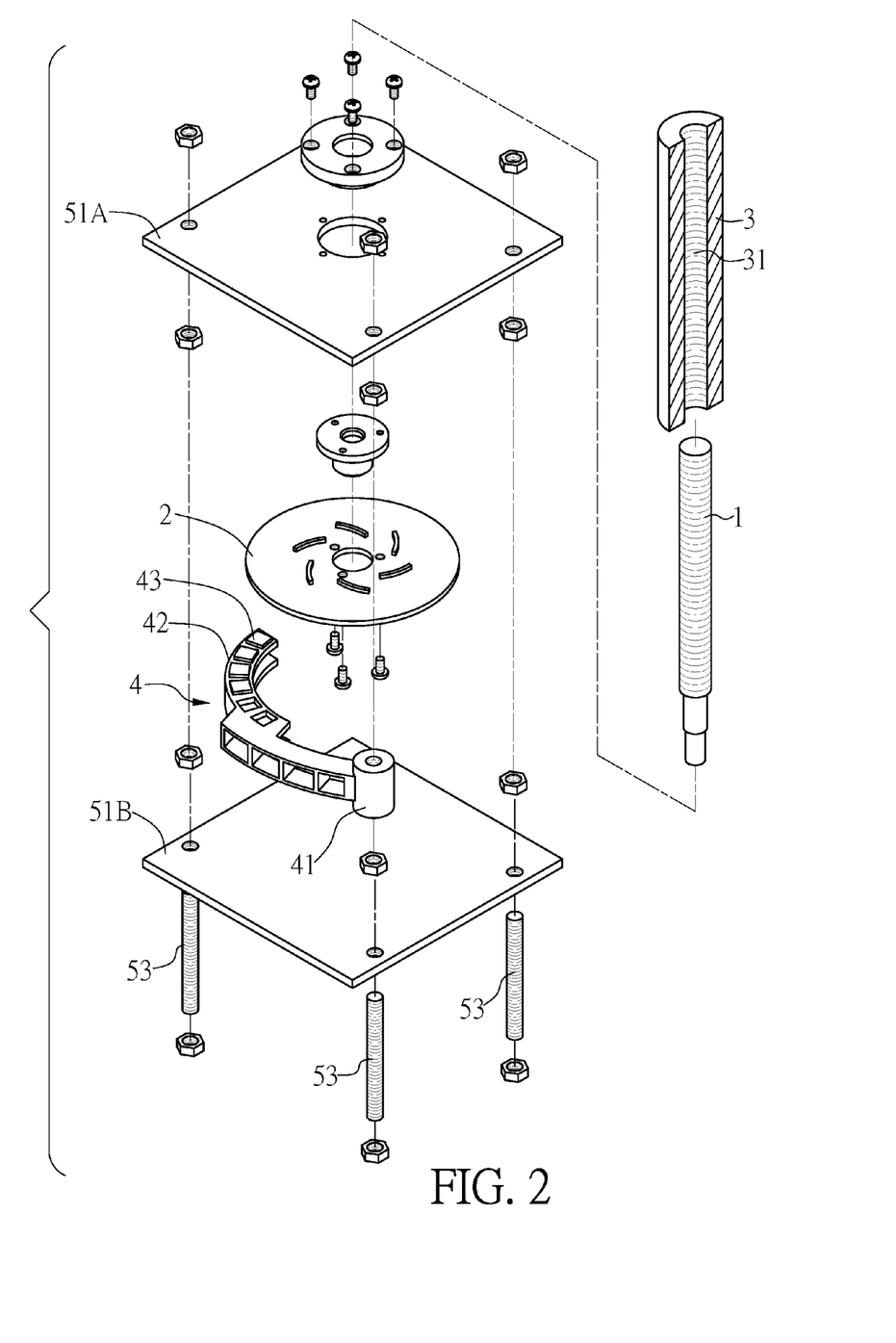
FIG. 2 illustrates an exploded view of the linear displacement damper structure.

Please refer to FIGS. 1 and 2, which illustrate a linear displacement damper structure according to an exemplary embodiment of the present invention. The linear displacement damper structure comprises a screw shaft 1, a metallic disk 2, a screw barrel 3, and a controller 4. In this embodiment, the screw shaft 1 is pivoted on a base member 5 so as to rotate on the base member 5 with its pivoting axis. The base member 5 has two positioning portions 51A, 51B spaced from each other. An operating space 52 is formed between the two positioning portions 51A, 51B, and the two positioning portions 51A, 51B are connected and fixed with each other by several connecting members 53. The screw shaft 1 is pivoted on one of the positioning portions, namely 51A, via a one-way bearing 11, and a first end of the screw shaft 1 is extending toward the operating space 52.

The metallic disk 2 is assembled in the operating space 52 and connected to the first end of the screw shaft 1. In this embodiment, the metallic disk 2 is an aluminum alloy disk.

Figure 3:
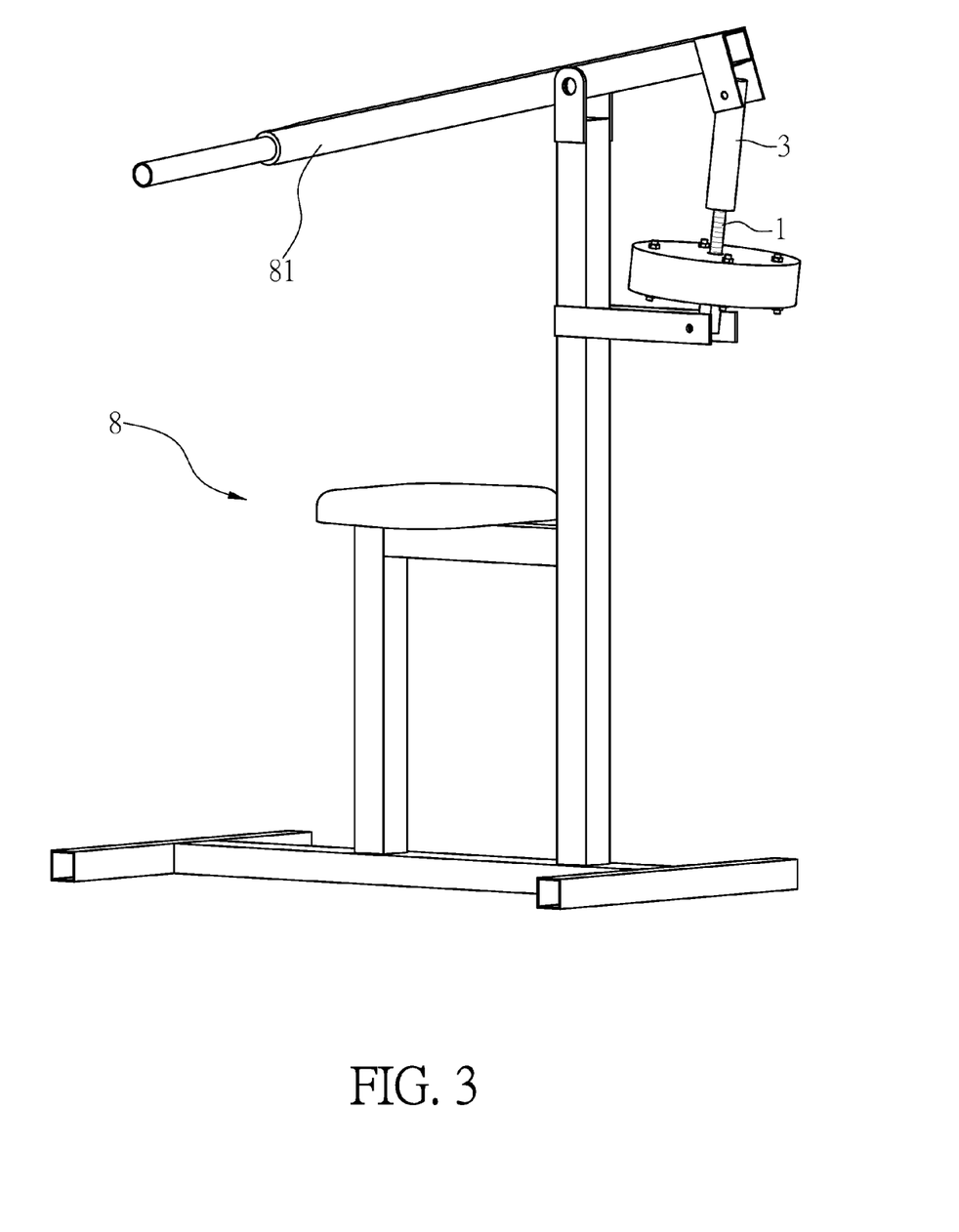
FIG. 3 illustrates a schematic view showing the linear displacement damper structure is utilized in a training equipment.
Figure 5:
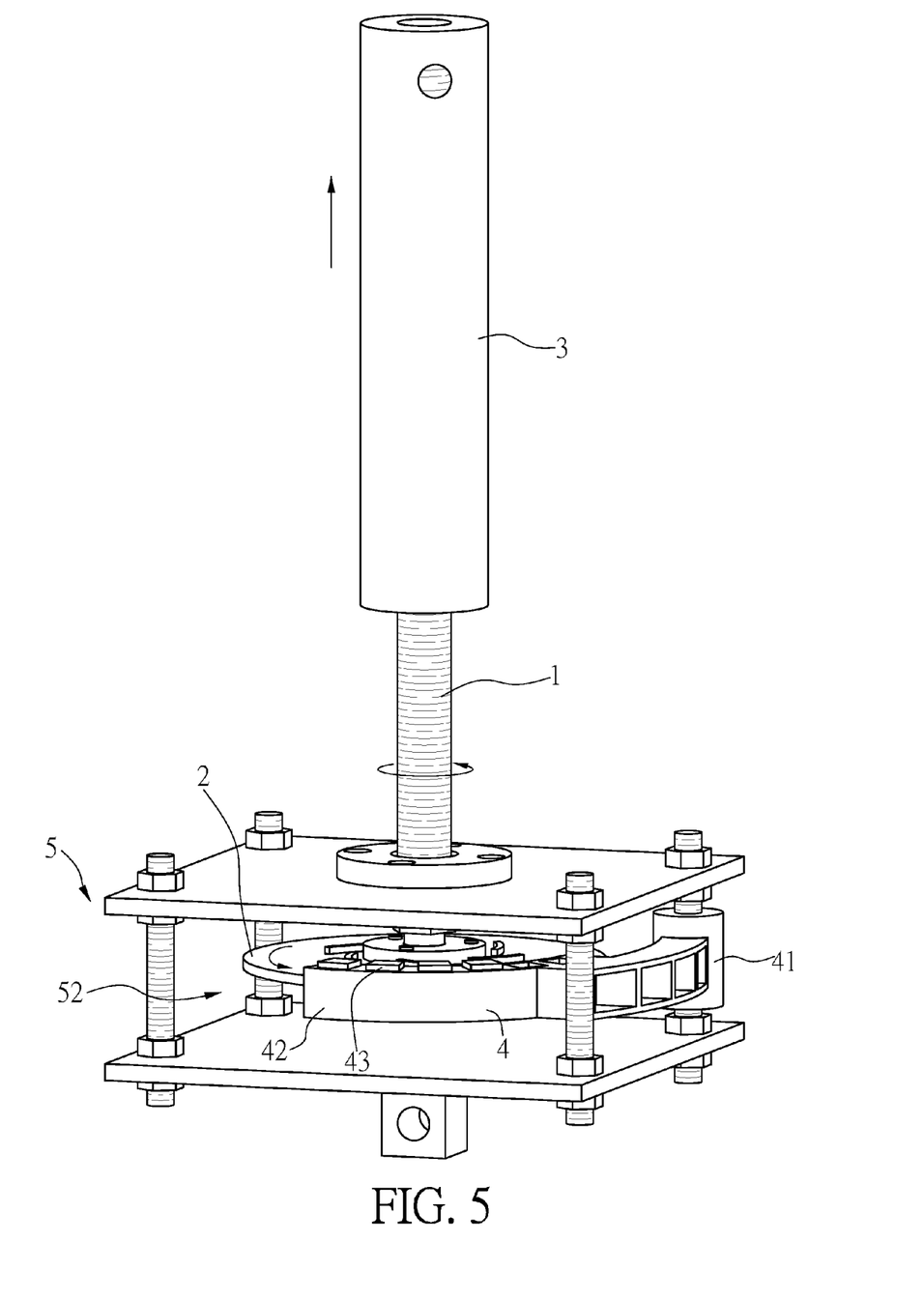
FIG. 5 illustrates an operational view of the linear displacement damper structure.

The screw barrel 3 is an elongated barrel having a long threaded hole 31, and the screw barrel 3 is threaded with the screw shaft 1. Accordingly, the screw barrel 3 performs a linear displacement along a length direction of the screw shaft 1 relative to the screw shaft 1, so that the screw barrel 3 drives the screw shaft 1 to perform a rotation as shown in FIG. 5. For example, the screw barrel 3 may be connected to an external device, like a pull bar 81 of a training equipment 8 shown in FIG. 3. When a user pulls the pull bar 81, the screw barrel 3 performs the linear displacement along the length direction of the screw shaft 1 relative to the screw shaft 1, so that the screw shaft 1 is rotated by the screw barrel 3 and the screw shaft 1 further drives the metallic disk 2 to rotate.

Figure 4:
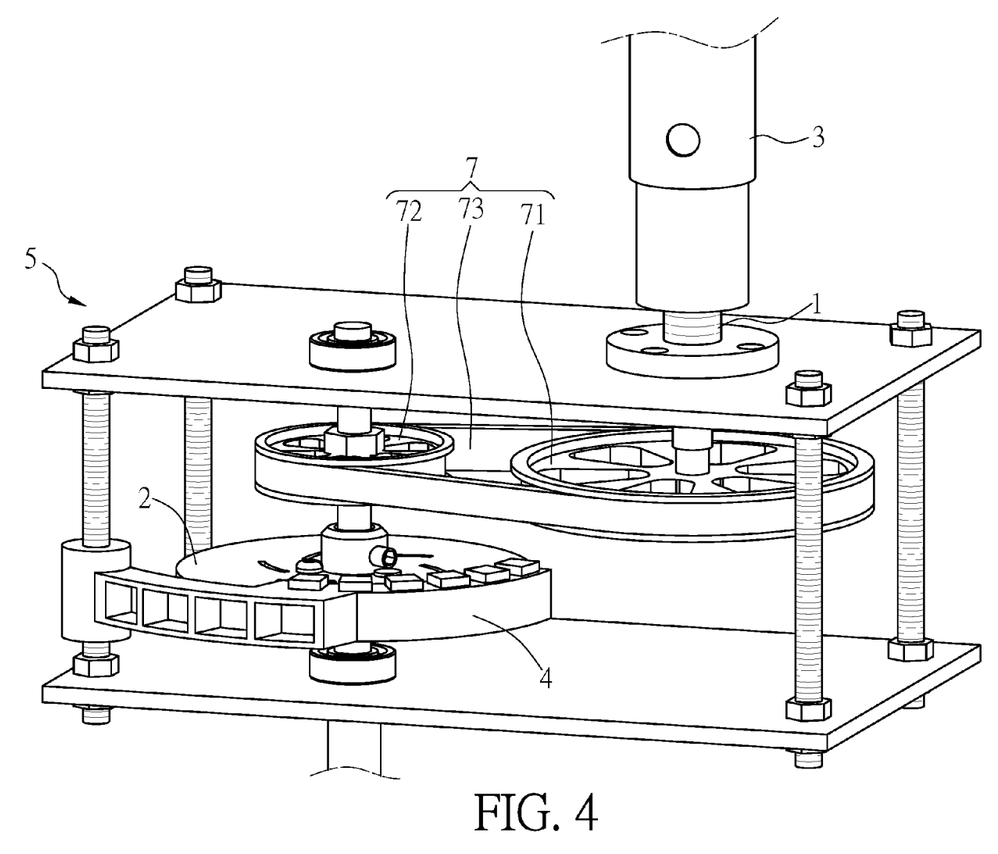
FIG. 4 illustrates a perspective view of a linear displacement damper structure according to another embodiment.

In another embodiment, as shown in FIG. 4, the screw shaft 1 and the metallic disk 2 are connected by a transmission mechanism. The transmission mechanism may transmit a rotation of the screw shaft 1 to drive the metallic disk 2 to rotate. Specifically, the transmission mechanism may be a belt-pulley mechanism 7. The screw shaft 1 is connected to a first pulley 71, the metallic disk 2 is connected to a second pulley 72, and the first pulley 71 and the second pulley 72 are surrounded and connected by a belt 73. Accordingly, when the screw shaft 1 is rotated by the screw barrel 3, the first pulley 71 is simultaneously rotated along with the rotation of the screw shaft 1, and the second pulley 72 is rotated by the transmission of the belt 73. Hence, the pulley-belt mechanism 7 drives the metallic disk 2 to rotate. The rotation speed of the metallic disk is determined by the pulley-belt mechanism 7; in detail, the rotation speed of the metallic disk 2 is determined by the difference between a diameter of the first pulley 71 and that of the second pulley 72.

Figure 6:
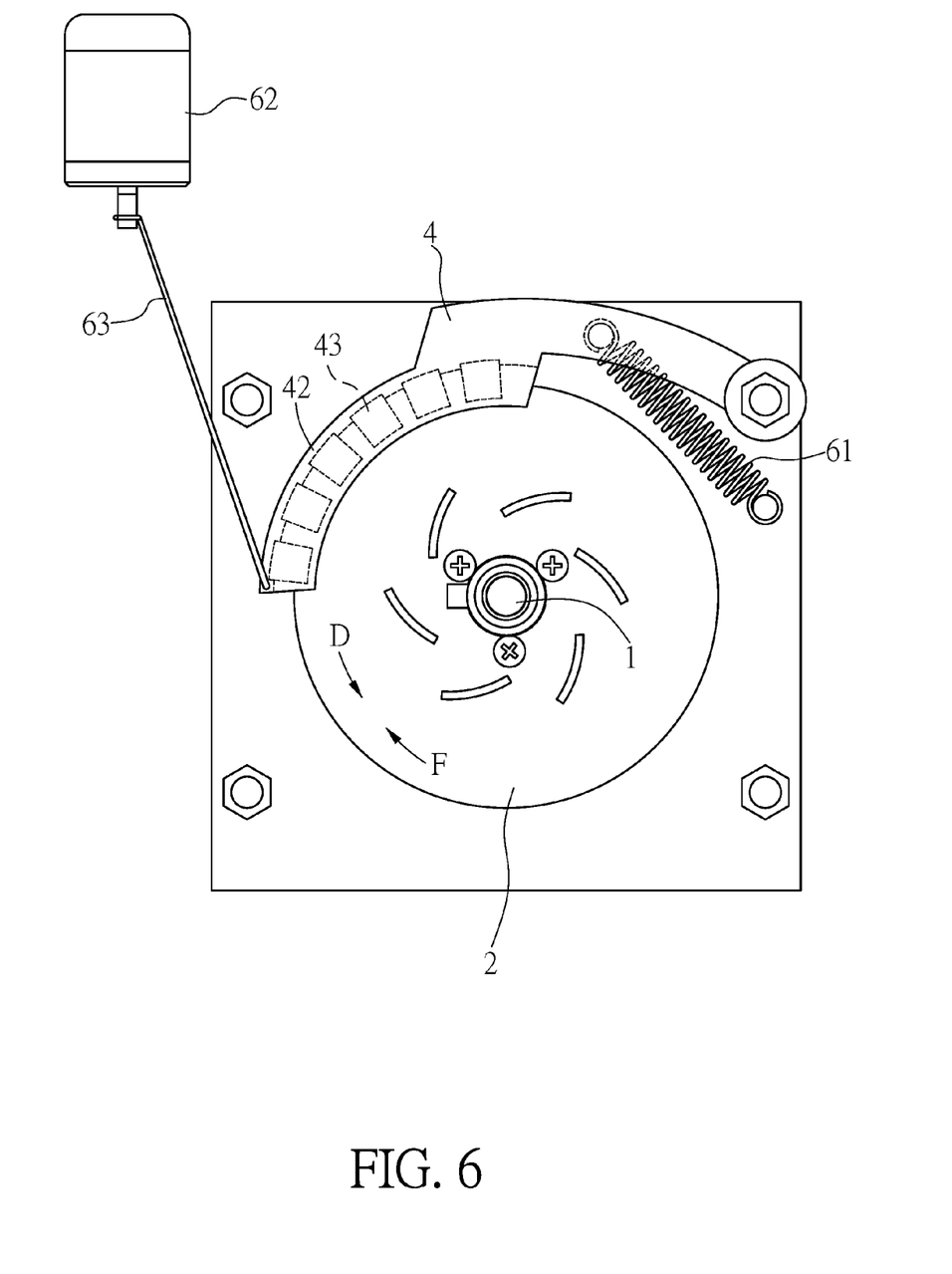
FIGS. 6 and 7 illustrate operational views of the linear displacement damper structure from another view.

On the other hand, as shown in FIG. 1, a controlling member 4 is disposed near to the metallic disk 2. The controlling member 4 comprises a permanent magnet 43 so as to make the metallic disk 2 generate magnetic resistance. Hence, the resisting force for rotating the metallic disk 2 and the screw shaft 1 increases. In this embodiment, as shown in FIGS. 1 and 6, the controlling member 4 is assembled in the operating space 52, and one of two ends, i.e., a pivoting end 41, of the controlling member 4 is pivoted on one of the connecting members 53. The other end of the controlling member 4 is a controlling end 42, and the permanent magnet 43 is assembled to the controlling end 42. The controlling end 42 is extending out of a periphery of the metallic disk 2, and the controlling end 42 is not in contact with the metallic disk 2.

Accordingly, the permanent magnet 43 of the controlling member 4 generates a magnetic field, and the metallic disk 2 is within the magnetic field. When the metallic disk 2 is rotated by the linear displacement of the screw barrel 3, the metallic disk 2 generates an eddy current for resisting the change of the magnetic flux according to the Lenz's law. Then, the eddy current generates a magnetic force F opposing to the rotation direction D of the metallic disk 2 so as to generate a resisting force for rotating the metallic disk 2. Based on this, for the screw barrel 3 and the external device connected to the screw barrel 3, the resisting forces encountered upon operating the screw barrel 3 and the external device increase. Hence, the user has to apply much more forces for driving the training equipment to achieve the training purpose.

Moreover, because of the structural configuration, during the process for forming resisting force, the controlling member 4 is not in contact with the metallic disk 2, so that the components are not worn against each other to affect the damping force.

Figure 7:
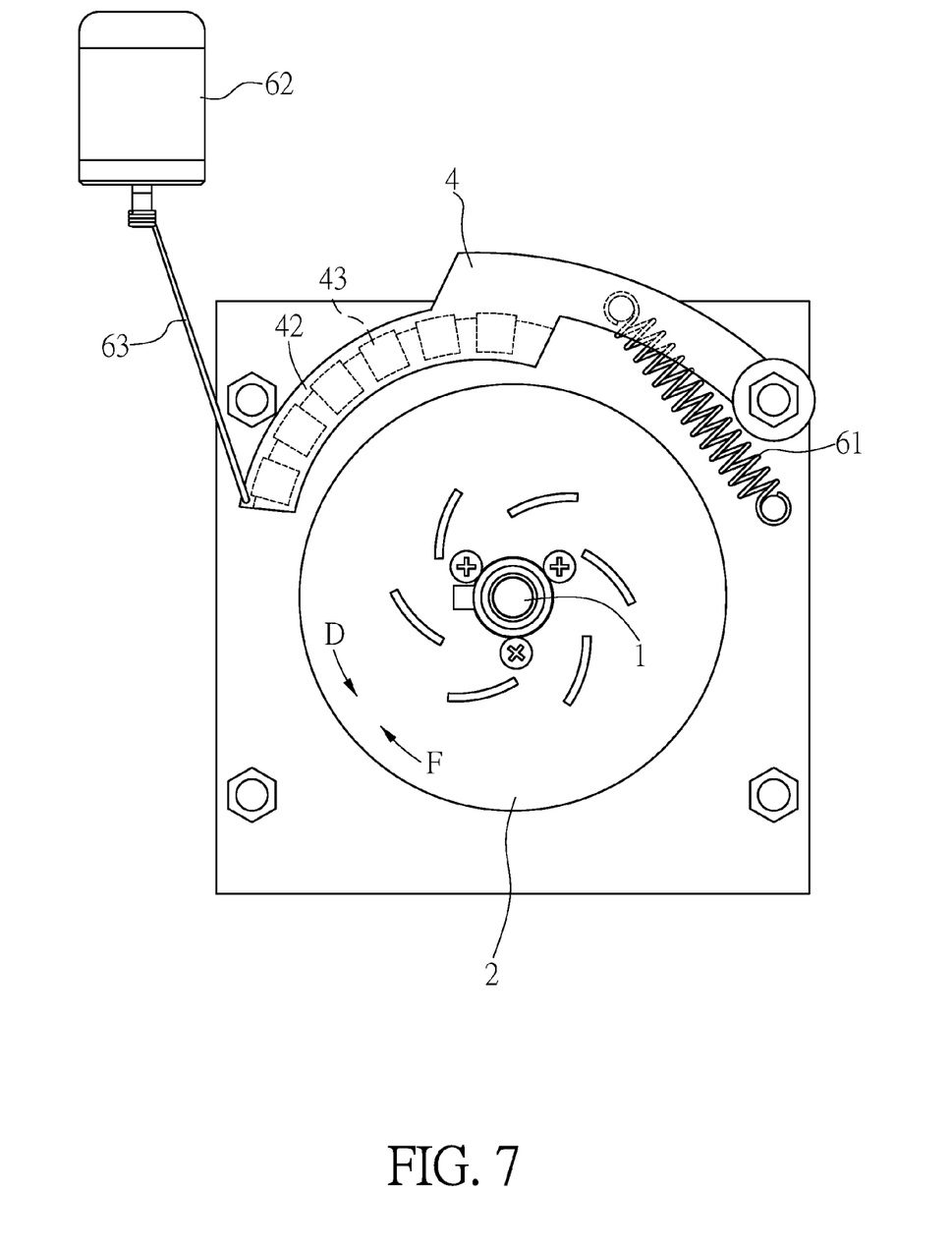

Furthermore, the magnitude of the resisting force can be adjusted by the distance between the permanent magnet 43 and the metallic disk 2. The damper structure comprises a driving member for driving the controlling member 4 to move to change the distance between the permanent magnet 43 and the metallic disk 2. Therefore, the magnitudes of the eddy current and the resisting force caused by the eddy current can be adjusted. In this embodiment, as shown in FIGS. 6 and 7, a spring 61 is assembled between the controlling member 4 and the connecting member 52 pivoted with the controlling member 4. Therefore, the spring 61 normally pushes the controlling end 42 of the controlling member 4 toward the metallic disk 2. The controlling end 42 is connected to a motor 62 by a rope 63. The motor 62 is controllable to pull the rope 63 so as to define the position of the controlling end 42. Accordingly, the magnitude of the resisting force can be adjusted by changing the position of the permanent magnet 43. Consequently, the resisting force provided by the damper structure can be standardized and applied widely.

What is claimed is:

1. A linear displacement damper structure used in training equipment, comprising:
  a screw shaft fixed in a defined position;
  a metallic disk fixedly connected to the screw shaft;
  a screw barrel threaded with the screw shaft, wherein the screw barrel is adapted to be connected to an external device, and the screw barrel is driven by the external device to perform a linear displacement relative to the screw shaft along a length direction of the screw shaft, so that the screw barrel drives the screw shaft and the metallic disk to rotate;
  a controlling member disposed near to the metallic disk, wherein the controlling member comprises a permanent magnet; and
  a driving member for driving the controlling member to move so as to change a distance between the controlling member and the metallic disk.

2. The linear displacement damper structure used in training equipment according to claim 1, wherein the metallic disk is an aluminum alloy disk.

3. The linear displacement damper structure used in training equipment according to claim 1, wherein the screw shaft and the metallic disk are connected by a transmission mechanism, the transmission mechanism transmits a rotation of the screw shaft to drive the metallic disk to rotate.

4. The linear displacement damper structure used in training equipment according to claim 3, wherein the transmission mechanism is a belt-pulley mechanism.

* * * * *